United States Patent
Frecassetti et al.

(10) Patent No.: US 8,514,775 B2
(45) Date of Patent: Aug. 20, 2013

(54) SYSTEM AND METHOD FOR IMPROVING THE USE OF RADIO SPECTRUM IN TRANSMISSION OF DATA

(75) Inventors: Mario Giovanni Frecassetti, Bergamo (IT); Giacomo Mirelli, Carugate (IT); Marzio Gerosa, Seregno (IT)

(73) Assignee: Alcatel Lucent, Paris (FR)

( * ) Notice: Subject to any disclaimer, the term of this patent is extended or adjusted under 35 U.S.C. 154(b) by 662 days.

(21) Appl. No.: 12/173,634

(22) Filed: Jul. 15, 2008

(65) Prior Publication Data

US 2009/0022179 A1 Jan. 22, 2009

(30) Foreign Application Priority Data

Jul. 17, 2007 (EP) .................................... 07301243

(51) Int. Cl.
 *H04W 4/00* (2009.01)
(52) U.S. Cl.
 USPC .......................................................... 370/328
(58) Field of Classification Search
 None
 See application file for complete search history.

(56) References Cited

U.S. PATENT DOCUMENTS

| | | | |
|---|---|---|---|
| 6,748,021 B1 | 6/2004 | Daly | |
| 6,839,566 B2 * | 1/2005 | Casaccia et al. | 455/515 |
| 7,609,610 B2 * | 10/2009 | Abe et al. | 370/204 |
| 8,320,567 B2 * | 11/2012 | Yadav et al. | 380/270 |
| 2002/0136170 A1 | 9/2002 | Struhsaker | |
| 2003/0035440 A1 * | 2/2003 | Casaccia et al. | 370/473 |
| 2003/0036399 A1 * | 2/2003 | Casaccia et al. | 455/515 |
| 2003/0036400 A1 * | 2/2003 | Casaccia | 455/515 |
| 2003/0210710 A1 * | 11/2003 | Odman | 370/471 |
| 2004/0102215 A1 * | 5/2004 | Karr et al. | 455/552.1 |
| 2005/0089004 A1 * | 4/2005 | Casaccia et al. | 370/347 |
| 2005/0190776 A1 * | 9/2005 | Hassan et al. | 370/401 |
| 2005/0201319 A1 * | 9/2005 | Lee et al. | 370/321 |
| 2005/0259613 A1 * | 11/2005 | Garudadri et al. | 370/328 |
| 2006/0002484 A1 * | 1/2006 | Miyazaki et al. | 375/259 |
| 2006/0007952 A1 * | 1/2006 | Oishi et al. | 370/465 |
| 2006/0018307 A1 * | 1/2006 | Michalewicz et al. | 370/352 |
| 2006/0067256 A1 * | 3/2006 | Alazraki et al. | 370/300 |
| 2007/0230461 A1 * | 10/2007 | Singh et al. | 370/389 |
| 2008/0037547 A1 * | 2/2008 | Jang | 370/394 |
| 2008/0069032 A1 * | 3/2008 | Liu | 370/328 |
| 2008/0125137 A1 * | 5/2008 | Rajkotia et al. | 455/452.2 |
| 2008/0165709 A1 * | 7/2008 | Soliman | 370/280 |
| 2009/0067424 A1 * | 3/2009 | Zhang et al. | 370/389 |
| 2009/0129503 A1 * | 5/2009 | Sagara | 375/302 |
| 2010/0135165 A1 * | 6/2010 | Parolari et al. | 370/252 |

FOREIGN PATENT DOCUMENTS

| | | |
|---|---|---|
| EP | 0998069 A2 | 5/2000 |
| WO | 9916264 | 4/1999 |

* cited by examiner

*Primary Examiner* — Bob Phunkulh
(74) *Attorney, Agent, or Firm* — Sughrue Mion, PLLC

(57) ABSTRACT

System and method for improving the use of radio spectrum in transmission of data, according to which the payload information of any known line interface is divided into a plurality of data portions of smaller which are then grouped into packets so as to be subsequently radio transmitted. For transmission of such packets, suitable radio channels are selected. The invention also relates to reception of such radio channels having such packets incorporated therein, wherein the received packets are then transformed into payload information for inputting into corresponding line interfaces.

15 Claims, 4 Drawing Sheets

SYSTEM AND METHOD FOR IMPROVING THE USE OF RADIO SPECTRUM IN TRANSMISSION OF DATA

This application is based on and claims the benefit of European Patent Application No. 07301243.7 filed Jul. 17, 2007, which is incorporated by reference herein.

The present invention relates to the field of radio communications. More particularly the invention relates to improving the use of radio spectrum in transmission of data and is applicable to any and all wireless communication systems.

BACKGROUND OF THE INVENTION

As it is well known, communication of information though radio is made using radio spectrums. Radio spectrums are in fact ranges of frequencies. Due to the limited available range of frequencies, different wireless transmission services are assigned specific ranges of frequencies which vary from one service to another. Therefore a specific wireless service can only use the spectrum assigned thereto. The limited availability of the frequency ranges on the one hand, and the increasingly growing demand for use of wireless transmission, on the other, give rise to the need of optimizing the use of the spectrum as much possible.

In certain communication networks, the communication is partly wireless and partly wireline. An example of this situation is where a wireline communication data flow such as for example one in an ISDN is subsequently to be transmitted through the air for example by microwave transmission. In such a scenario, at a certain point of the network, the wireline (physical) equipment interfaces, in any convenient manner, with the wireless (radio) equipment.

In the following, the terms "line interface" are used to refer to any baseband interface used for the wireline communication part, such as for example:

Plesiochronous Digital Hierarchy, or PDH (ITU-T: G.703)
Integrated Services Digital Network, or ISDN (ITU-T: G 703, G704, I412 and ETS300233)
Synchronous Digital Hierarchy, or SDH (ITU-T: G 703, G707, G708, G783, G784, G957, G750)
Low speed data interface (ITU-T: V.11, V.24, V28) or
Ethernet data interface (IEEE 802.3 ecc)

When a line interface is coupled to a radio equipment for transmitting data on the air, the line interface data is carried over radio channels under certain restrictions. For instance, in a typical case of a system carrying two line interfaces STM1, to be carried over two 28 MHz radio channels using two transceivers with a modulation scheme of 128QAM, it is common practice that the first STM1 is carried over the first radio channel and the second STM1 is carried over the second radio channel. Therefore the line interface is carried as a whole over one channel or, if the size of the channel would allow, several line interfaces are carried over the same channel. However such a solution presents an important drawback in view of the use of radio resources because in many occasions it may occur that by carrying the traffic of one or more line interfaces over one channel, the effective capacity of the channel to be used for carrying useful information (traffic) is not used in an optimum manner. Therefore, by using the known solutions the available resources of the radio spectrum are not flexibly and efficiently used.

DESCRIPTION OF THE INVENTION

A solution is therefore desired according to which the use of radio spectrum for transmitting data flow from a line interface through the air is made as much as possible flexible, efficient and optimum.

The above objective is achieved by using the solution proposed by the present invention according to which the payload information of any known line interface, independently of their intrinsic characteristics, such as constant bit rate (CBR) or non-constant bit rate (NCBR), are divided into a plurality of data portions of smaller size in comparison to the size of the original payload. The data portions are then inserted into packets so as to be subsequently radio transmitted. For transmission of such packets, suitable radio channels are selected.

Preferably, an appropriate modulation scheme is also selected for transmitting the selected suitable channel. A packet or a plurality of packets are then incorporated inside the selected radio channel and the channel is transmitted using the selected modulation scheme.

Accordingly, one object of the present invention is that of providing a method of radio transmitting a payload information of a line interface the method comprising the steps of:
dividing the payload into a plurality of data portions,
grouping a data portion so as to form a packet,
selecting an available radio channel, suitable for incorporating said packet in said radio channel,
incorporating at least one packet in the selected radio channel
transmitting, said selected radio channel with said at least one packet incorporated in the radio channel.

According to an aspect of the invention, the method further comprises the steps of:
selecting a modulation scheme appropriate for the characteristics of a link budget of said radio transmission
transmitting, said selected radio channel with said at least one packet incorporated in the selected radio channel, based on said selected modulation scheme.

Another object of the present invention is that of providing a packet processor for transmitting or receiving a payload information of a line interface the packet processor comprising:
a framer for dividing a payload into a plurality of data portions and for grouping a data portion so as to form a packet,
a clock unit for providing a clock signal to said packet,
a packet builder for adding a header to said packet.

According to an aspect of the invention, in the packet processor in reception mode:
the framer is adapted for grouping together data portions corresponding to a specific payload, and
the packet builder is adapted for breaking a packet into portions of traffic data, by separating said portions from an overhead of the packet received and adapted for inputting said portions of traffic into the framer.

A further object of the invention is that of providing a transmitter for radio transmitting a payload information of a line interface the transmitter comprising a packet processor of the invention.

According to an aspect of the invention, the transmitter further comprises:
a packet aggregator for multiplexing a plurality of packets formed by said packet processor to form a multiplexed packet stream
a packet allocator for allocating at least one packet from said multiplexed packet stream to one or more available radio channel having a suitable size for having said packet allocated,
a transmitter unit for radio transmitting said available radio channel with said packet allocated to said radio channel.

According to a further aspect of the invention, the transmitter further comprises means for selecting a modulation scheme appropriate for characteristics of a link budget of said radio transmission and means for transmitting said available radio channel with said packet allocated in the one or more available radio channel, based on said selected modulation scheme.

A further object of the invention is that of providing a receiver, for receiving radio transmission of payload information comprising a packet processor of the present invention.

A still further object of the invention is that of providing a transceiver comprising the transmitter and the receiver of the invention.

A yet further object of the invention is that of providing a programmable device comprising storage means with a software program recorded thereon, the software program comprising instructions which, when executed on the device, cause the device to carry out the steps of the method of the invention.

These and further features and advantages of the present invention are described in more detail in the following description as well as in the claims with the aid of the accompanying drawings.

EXAMPLES OF PREFERRED EMBODIMENTS

As already mentioned above, in one aspect, the invention relates to transmitting payload information from a line interface through radio whereby the use of radio spectrum is improved or optimized. The line interface may be of any known type such as for example PDH, SDH, ISDN or Ethernet. For the purpose of the following description a "generic" line interface is considered and discussed. By "generic" it is meant that certain characteristics which are necessary for the implementation of the solution of the present invention are common in all the known examples. Clearly, the various known line interfaces (such as the examples given above) may have different detailed structures. However from a general point of view, they all have a part intended for incorporating useful information, which is usually referred to as the payload. A payload is therefore considered to be a common characteristic among all the variants of line interfaces to which the solution of the present invention is applicable. Payloads may be incorporated in a frame, although this is not always the case, typically together with an additional section called "overhead" or "header" typically containing information on frame structure, source or destination addresses, etc which are all known features in the related art.

Figure 1:
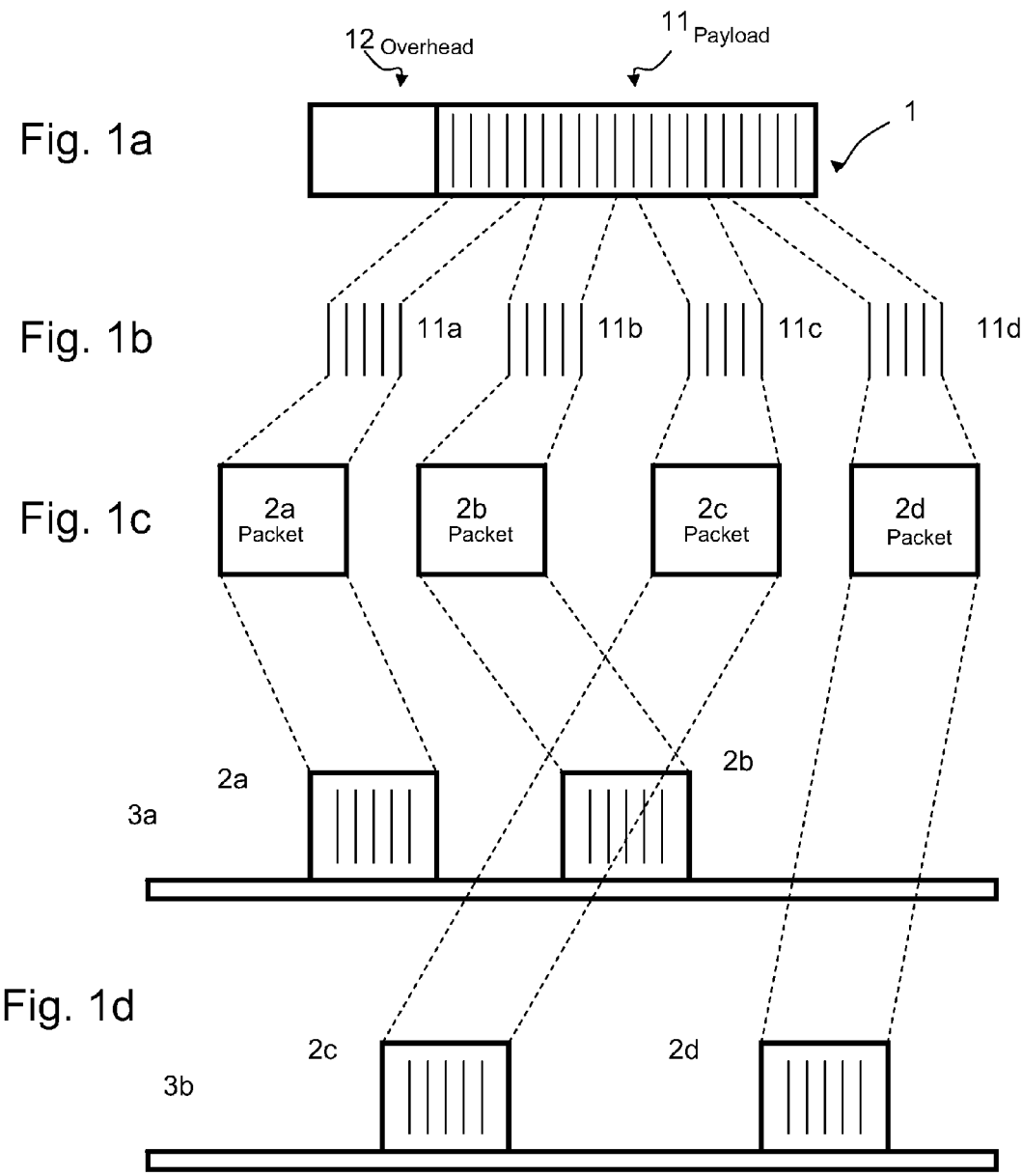
FIGS. 1a to 1d show schematic representations for an exemplary sequence of steps to be taken for implementing the solution of the present invention.

Referring now to FIG. 1a, there is shown a schematic diagram of a frame structure 1 having a payload 11 and an overhead 12. The payload 11 is shown to contain traffic information which may be of any known kind, such as voice or data. This is represented in FIG. 1a by a striped zone.

According to the invention, the payload is divided into a plurality of entities of smaller size. These entities of smaller size are represented schematically in FIG. 1b by reference numerals 11a, 11b, 11c and 11d. It can be appreciated from this figure that the content of theses entities of smaller size are in fact portions of the payload 11. These portions will be referred to hereinafter as "data portions".

In the next step, the data portions 11a-11d are grouped into packets. The packets are represented schematically in FIG. 1c by reference numerals 2a, 2b, 2c and 2d. In addition to the data portions, a packet is preferably provided with additional information as deemed required or appropriate for a specific use, such as for example information on source and destination, flags to designate the start and the end, information on the integrity of the contents, priority information, information on the type of payload and the like.

In order to be able to transmit the packets formed, a selection is made from available radio channels, thereby selecting one or more radio channels which are considered to be suitable for incorporating a packet formed as described above, with the eventual aim of transmitting said radio channel with the packet incorporated therein. For selecting such a channel, in addition to the requirement of availability, the size of a specific channel with respect to the amount and the size of the packets to be incorporated is also taken into account.

The packets are then incorporated in a suitable radio channel selected as described above. It is to be noted that packets may be incorporated into channels in any convenient number. For example, it may occur that all the packets 2a, 2b, 2c and 2d originating from a single payload 11 are incorporated in one single channel (not shown). Alternatively it may occur that some packets are incorporated in one selected channel and others are incorporated in another selected channel. This is shown schematically in FIG. 1d, wherein channel 3a has incorporated the packets 2a and 2b and channel 3b has incorporated packets 2c and 2d.

In order to transmit the radio channel with the packet incorporated therein, a modulation scheme appropriate for transmitting over the selected radio channel is preferably selected.

Once the packets are incorporated in the selected channels and preferably an appropriate modulation scheme is chosen, said radio channel is transmitted having said packet incorporated therein, based on said modulation scheme.

It is to be noted that the exemplary description given above in relation to FIGS. 1a-1d is intended for understanding the basic concept underlying the invention. Therefore, although the figure shows an example with some packets incorporated into a channel and some others into another channel, leaving empty space in the channels, in practice attempt is made to fill the available capacity of each channel as much as possible, thus optimizing the use of the resources in the radio transmission.

Figure 2:
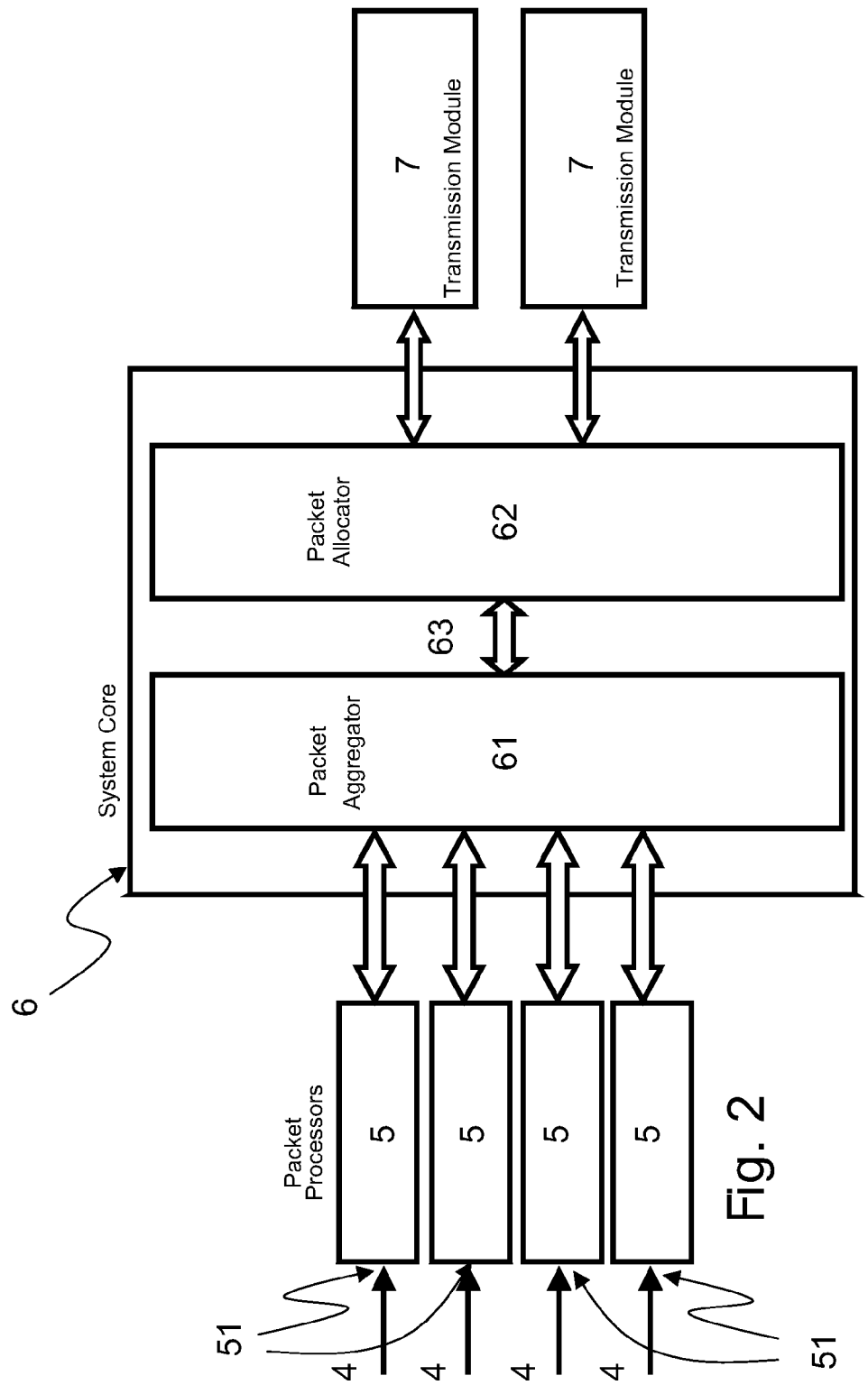
FIG. 2 is a schematic block diagram representation of an embodiment showing an exemplary general architecture useable according to the present invention.

FIG. 2 is a schematic representation of a general architecture of modules used for carrying out the invention. It is to be noted that this representation is simplified in order to only show the modules which are relevant for understanding the present description and is not be interpreted to be limitative. Those skilled in the art would recognize that the architecture may, in practice, include other parts and units which are not relevant for the understanding of the present description and thus are not shown.

In FIG. 2, there are shown a plurality of line interfaces 4 which may vary in number according to the specific needs. The interfaces may be of continuous bit rate nature (CBR), or non-continuous bit rate nature (NCBR). Examples of CBR are PDH, SDH, SONET and an example of NCBR is Ethernet.

The line interfaces 4 are coupled to respective packet processors 5. Packet processors may be located within respective access modules (not shown in the figure), however this is optional. An access module performs the function of interfacing in order to provide access from a line interface 4 to the central unit, or core 6, of the system. The type of an access modules is chosen in accordance with the type of line interface to which it is connected; for example, an SDH line interface is to be connected to an access module adapted to receive and process SDH payloads. Examples of such access modules are modules to interface with modes such as 8xE1, 16xE1, 32xE1, DS1, E3, SDH, ATM, Optical Gigabit Ethernet, among others known in the related art.

Irrespective of whether a packet processor 5 is inside or outside an access module, the packet processor 5 is located at a position suitable to receive the incoming data upstream of the core 6 of the system. A packet processors 5 is, in transmission mode, in charge of forming packets. This is done by first dividing the payload, received at an input 51 thereof from the respective line interface 4 (after having passed through a corresponding access module), into data portions of smaller size (as compared to the size of the payload itself). Next the packet processor 5, groups said data portions into packets. The operation and structure of the packet processor 5 will be described in detail further below with reference to FIG. 4.

In this manner, packets are formed in the packet processors 5 and are then input into the core 6 which is in charge of further processing the received packets. If the incoming information of the line interface is already in the form of packets, the packet processor 5 need not form further packets from the incoming packets, but simply use the latter as packets to be input into the core 6. In this case, the incoming packets may need some adaptation as to their format; if this is needed, the packet processor 5 performs the required adaptation.

Core 6 comprises a packet aggregator 61 and a packet allocator 62 as show in FIG. 2. Here again the representation of the core 6 is simplified in order to only show the units which are relevant for understanding the present description and is not be interpreted to be limitative. Those skilled in the art would recognize that the core may, in practice, include other parts and units which are not relevant for the understanding of the present description and thus are not shown.

In transmission mode, the packet aggregator 61 receives packets from the plurality of packet processors (four in the figure) and multiplexes the received packets into one multiplexed packet stream. This is done because in practice, handling of a packet stream is performed in a more flexible way as the stream could be easily divided by the packet allocator 62 into frames which are then sent to radio plug-ins in one or more directions. In the present example, related to transmission mode, the packet aggregator 61 operates in the direction towards the packet allocator 62; whereas in reception mode, which will be described further below, the packet aggregator 61 operates towards a packet processor 5. The packet aggregator 61 may be connected to any suitable number of packet allocators 62 or packet processors 5 depending on the number of ports available on the packet aggregator 61.

A typical example of a packet aggregator is a simple Ethernet switch. The multiplexed packet stream 63 is then input into the packet allocator 62. In transmission mode, the packet allocator 62 is in charge of first selecting one or more suitable radio channel(s), and once the selection is done, allocating a packet from said received multiplexed packet stream 63 to one or more of the suitable radio channels selected. In particular, the packet allocator 62 receives the packets streams, and according to the capacity and/or configuration of the selected radio channel, divides accordingly the packet stream into packets in order to form suitable radio frames to be transmitted through air over the available channel. The Packet allocator 62 may also add redundancy to the frames in order to improve the transmission over air. The process of building radio frames may be according to the known solution in the related art. This process may include adding a suitable error correction code and other known measures.

For a radio channel to be considered suitable for selection, the main conditions are that the channel must be available and it must have a size suitable for incorporating at least one packet therein. Other criteria may also be applied according to specific use.

In order to perform this process, an ASIC or an FPGA or a combination thereof may be used for the allocation operation.

The channels having packets incorporated therein are then input into radio transmission modules 7 from which they are subsequently transmitted through wireless transmission.

The wireless transmission of the channels is done by using a modulation scheme. Preferably a modulation scheme is selected which is more appropriate for such transmission. One criterion for considering a modulation scheme as appropriate is based on taking into account the link budget of transmission. A link budget relates to considerations that correspond to the gains or losses in transmission from a transmitter end to a receiver end for which known methods of calculation exist. The modulation scheme may be selected by the packet allocator 62 or the radio transmission module 7.

The invention also provides for distributing the payload of one incoming line interface 4 into more than one radio channels. This can be also observed from FIG. 2 and by assuming that only one of the four line interfaces is present, or only one of the line interfaces carries a payload, whereas at the output of the packet allocator 62, two channels are used which are transmitted through separate radio transmission modules 7.

Furthermore, it is to be noted that a single packet allocator 62 can allocate packets to more than one radio channel, according to the capacity required; and that more than one packet allocator 62 may be used depending on the number of different radio channels.

The radio channels themselves could be different in size and number.

Figure 3:
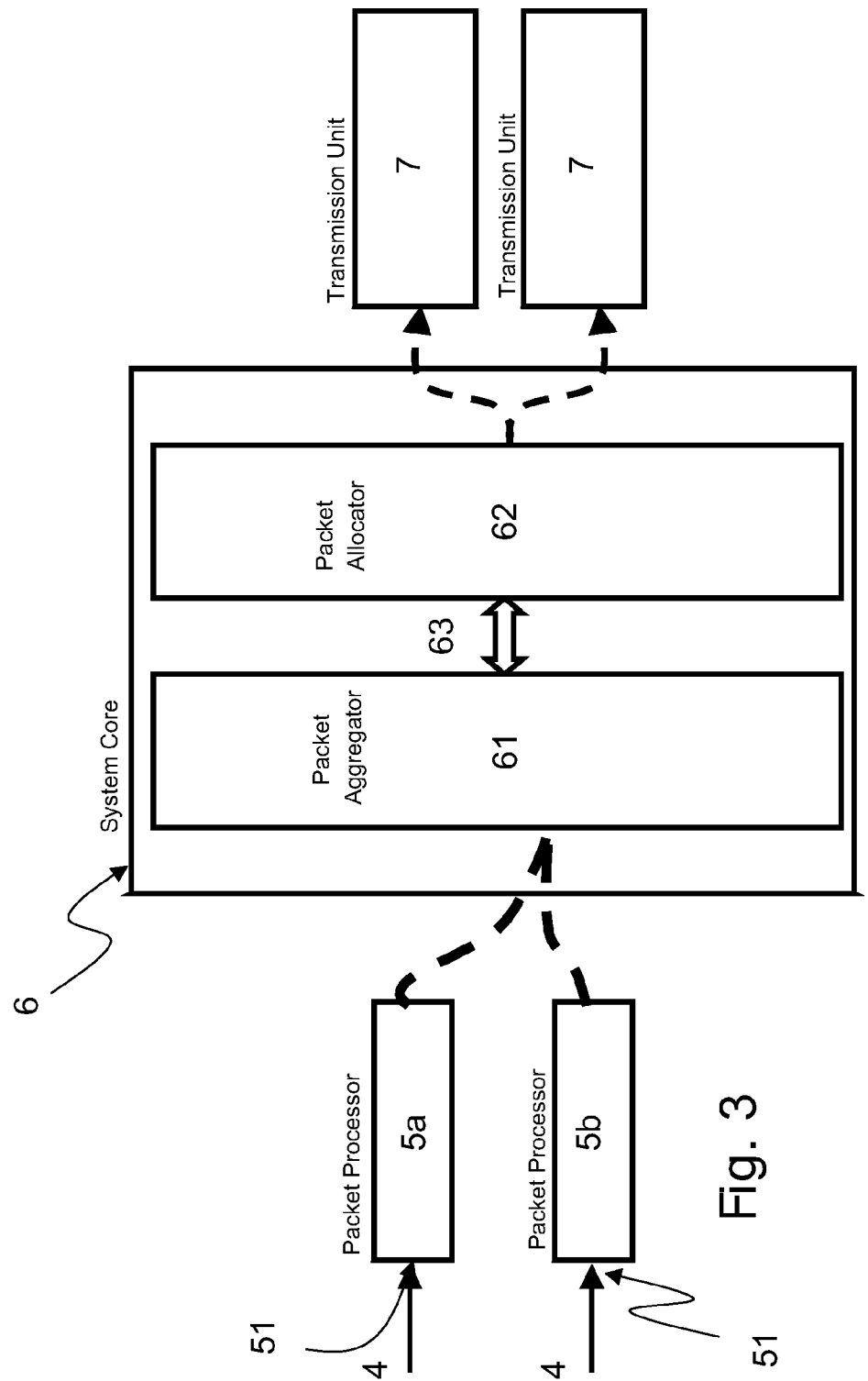
FIG. 3 is a schematic block diagram representation of another embodiment of the architecture useable according to the present invention.

FIG. 3 shows is a schematic representation of another embodiment of the invention wherein like elements of the figure have been denoted by like reference numerals as those of FIG. 2.

The embodiment of FIG. 3 differs from that of FIG. 2 in that different types of channels, coming from different line interfaces, may be merged together before entry into the packet aggregator 61. In this manner any combination of line interfaces, once merged, can be provided together at an input of the packet aggregator 61. Therefore, as shown in FIG. 3, line interfaces 4, are input into packet processors 5a and 5b which, as described already in relation to FIG. 2, process the incoming payload by dividing them into data portions of smaller size and grouping them into packets in order to be next input into the packet aggregator 61. As seen in the figure, the output 52 of one packet processor 5a is merged with the output 53 of another packet processor 5b at the point of entry into the packet aggregator 61. As mentioned above, the channels coming from the line interfaces 4 may be of different types. Once their payloads are grouped into packets in the packet processors, the packets can be easily merged and input at the entry of the packet aggregator 61.

From this point on, the further processing of the packets in the packet aggregator 61 and packet allocator 62 is performed in the manner described above in relation to FIG. 2.

Figure 4:
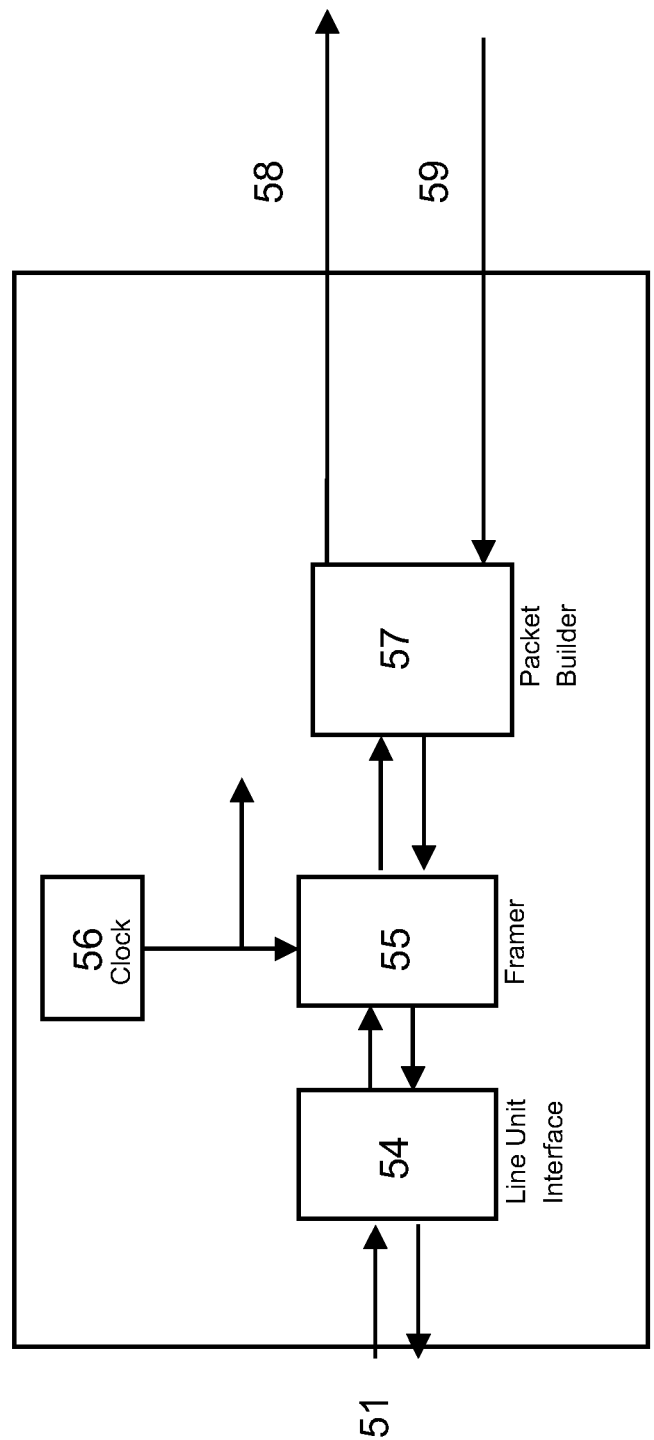
FIG. 4 is a schematic block diagram representation of an exemplary module for forming (in transmission) or breaking (in reception) packets according to the present invention.

FIG. 4 is a schematic representation of a packet processor 5 according to the present invention. Here also it is to be noted that this representation is simplified in order to only show the elements of the packet processor 5 which are relevant for understanding of the present description and it is not be interpreted in a limitative manner.

As seen in the figure, the packet processor 5 has a line unit interface 54 which is in charge of receiving the line interface payload at the input port 51, and performing electrical adaptation of the same. By electrical adaptation it is meant performing routine operations such as signal level or impedance adjustments for adapting the incoming signal for further stages of processing.

The payload is then input from the line unit interface 54 into a framer 55. In this unit, the payload is divided into data portions of smaller size and grouped into packets. The operation of framing may be governed, for example, by an FPGA or an ASIC.

The framer 55 is driven by a clock signal provided by the clock unit 56.

The packets so formed do not have overhead at this stage. Therefore, in order to prepare a packet suitable for a standard or conventionally accepted transmission they are input from the framer 55 into packet builder unit 57 where an overhead is added to the packet, thus making it suitable for transmission. The packet builder unit 57 could be any known device suitable for the intended use such as for example one known as SAToP/MEF8 (SAToP meaning 'Structure-Agnostic TDM over Packet' which is a known protocol and MEF8 being an Implementation Agreement for the Emulation of PDH Circuits over Metro Ethernet Networks) for a PDH related packet processor.

The packets, having overhead incorporated thereto, are output at a port 58 and are input into the packet aggregator 61.

The arrangements shown and discussed in the above embodiments of the present invention may preferably be bidirectional. That is to say, the invention may provide also for the possibility of receiving, radio channels carrying packets of payloads incorporated therein wherein the channels have been transmitted from a transmitter according to the transmission method of the present invention, as described above. Channels are received at a receiver end and processed further in order to extract the packets from the received channels. Then payloads are formed from the extracted packets and provided to the various corresponding line interfaces at the output of the receiver.

Due to the bidirectional nature of the architecture shown in the embodiment of FIG. 2, this same figure may be referred to in order to describe the operation of the system in reception mode.

Therefore, the transmitter of the present invention as described in relation to FIG. 2 may in fact operate as a receiver or a transceiver.

During reception, an air frame is received at radio module 7 which is in charge of inputting the radio frame into a packet allocator 62. Next, the packet allocator 62 performs a deframing operation, in order to extract the received packets from the radio frame and provide them to the packet aggregator 61. In reception mode, the packet aggregator 61 acts as a switch in charge of transmitting a packet to a corresponding access board incorporating a packet processor 5.

The packet processor is also bidirectional. Thus referring to FIG. 4, the operation of the packet processor will be described. In reception mode, the packets are received at the input port 59 and input into the packet builder 57 which operates in such a way as to break the packets into portions of traffic data which are intended to be reconstructed, by separating them from the overhead of the packets received. The portions of traffic data and the relevant information for reconstruction are then input into the framer 55. In reception mode the framer is in charge of grouping together the various data portions corresponding to a specific payload. In case clocking is needed it may be regenerated by the clock unit 56. The payloads thus formed are then input into the line unit interface 54 which is, in similar manner as described in relation to transmission mode, in charge of electrical adaptation of the signals to be output from the packet processor 5.

A packet as received by the packet processor 5 contains, in addition to data, relevant control signals indicative of destination address and any required identification of the packet. This information is used in order to reconstruct the traffic by identifying which parts of traffic should be grouped together (reconstructed) so as to form a payload for a specific line interface type (e.g. SDH). The address information may be used in order to identify to which line interface 4 should the reconstructed payload be forwarded. This operation is performed in a typical Packet Switching Machine or Packet Switching Network (PSN) environment which enables interface among packet allocators and packet processors.

In this manner, the payloads as reconstructed are input in their corresponding line interfaces 4.

In the following there are provided two examples of scenarios using the solution of the present invention.

In a first example, it is assumed that a link for 1x STM1 is needed in a certain frequency band which is very congested. By performing link assessment, it is considered that a 16 QAM modulation scheme is suitable using a conventional (or standard compliant) product. In this case, a 56 MHz channel is needed. This is because the system gain related to the 16 QAM is sufficient so as to cope with the link length and that the spectrum efficiency of a 16 QAM is appropriate for an STM1 transmission at 56 MHz.

It is now assumed that at this particular instant, a 56 MHz channel is not available, whereas there are only available two not adjacent 28 MHz channels.

In such a situation, the known solutions can provide one of the two following options:

A first option is to attempt to provide a transmission system with a 128QAM modulation scheme and with very large size antennas (which are very costly) in order to attempt to obtain, if at all possible, a suitable system gain and use a single 28 MHz channel. This solution is unlikely to be acceptable due to a number of drawbacks, such as for example, coexistences with the others links which makes it practically impossible to deploy, or limitation over the maximum EIRP (EIRP being the product of the power supplied to an antenna and the absolute gain of the antenna in a given direction).

A second option is to change the frequency bands. However this option also has also some drawbacks. One drawback is that it may happen that at the time of need, a different frequency band is not available. Another drawback is that it may not be possible to establish a link with the available frequency bands because of poor or adverse propagation conditions.

According to the solution of the present invention however, it is possible to provide conveniently a transmission system capable of using two 16QAM modes in the two available 28 MHz channels carrying each one half (0.5) STM1. In this case, the packet incorporated in each channel is, therefore, the 0.5 STM1.

In a second example, it is assumed that a link for 2x STM1 is needed in a certain frequency band which is very congested. By performing link assessment, it is considered that two 128 QAM modulation schemes are suitable using a conventional (or standard compliant) product. In this case, two 28 MHz channels are needed because the spectrum efficiency of a 128 QAM is appropriate for an STM1 transmission at 28 MHz.

It is now assumed that at this particular instant, the needed two 28 MHz channels are not available, and there is only available one 28 MHz channel and two 14 MHz channels.

In such a situation, the known solutions can provide a system with an efficiency level which is double with respect to the 128QAM with the drawbacks already described in the first example above. However, a system with such characteristics is not known to currently exist.

On the other hand, if two different systems are provided to do the operation, the cost of the systems as well as those of the spare parts would substantially increase.

Another option would be, as described in the first example, to change the frequency bands if possible. However this option also has the same drawbacks as those described in the first example above.

According to the solution of the present invention however, it is possible to provide conveniently a transmission system capable of using three 128QAM, one in the available 28 MHz channel carrying one STM1, and two in the available 14 MHz channels carrying each 0.5 STM1.

It is to be noted that where possible, the elements used for carrying out the invention can, where appropriate, include blocks which can be hardware devices, software modules or combination of hardware devices and software modules The method of the invention can be advantageously implemented on a Network Element, including means like an Application Specific Integrated Circuit (ASIC), a Field Programmable Gate Array (FPGA) and/or a microprocessor, and in a preferred embodiment through or together with a software process or software module including one or more software programs (computer programs) written in e.g. Very high speed integrated circuit Hardware Description Language (VHDL) or C or C++ or Java or another language, by one or more VHDL processes or C routines. Therefore, it is understood that the scope of the protection is extended to such a program and in addition to a computer readable means having a message therein, such computer readable storage means containing program code means for the implementation of one or more steps of the method, when this program is run on a computer, an ASIC, an FPGA or a microprocessor.

The various embodiments of the present invention may be combined as long as such combination is compatible and/or complimentary.

It is to be noted that the system (transmitter, receiver, transceiver, packet processor) of the invention can be used to practice another and materially different method and is not be construed to be limited to practicing only the method as claimed in the present invention. Likewise, the method of the invention can be practiced by another materially different system, device, apparatus or equipment than the one(s) claimed in the present invention as long as these are capable of performing the method of the invention.

It is also to be noted that the order of the steps of the method of the invention as described and recited in the corresponding claims is not limited to the order as presented and described and may vary without departing from the scope of the invention.

The solution proposed by the present invention provides the advantage of efficiently using the radio spectrum, due the fact that the choice of available radio channels is simplified and flexible. For instance, using the solution of the present invention provides the possibility of using channels partially, or that of using narrow channels remained unused, in the case a high congestion is present.

Another important advantage of the solution proposed by the present invention is an effective implementation of the so-called statistical multiplexing wherein a fixed bandwidth communication channel is shared into several variable bit-rate digital channels. For example, a CBR digital channel is transformed in variable bit-rate digital channel. Therefore a CBR stream is divided into packets that normally are delivered according to, for instance, some scheduling discipline managed using Quality of service index.

According to the invention and if needed, the sharing of the link is adapted to the basic CBR traffic and in addition, an instantaneous traffic demand (for example an NCBR or not priority CBR) of the data streams are transferred over each channel in parts of the channel which are not fully filled with payload.

In this manner, statistical multiplexing can provide an improvement in the use of a link thereby improving multiplexing gain.

The invention claimed is:

1. A method of radio transmitting a payload of a line interface, the method comprising the steps of:
dividing the payload into a plurality of data portions,
grouping said plurality of data portions so as to form a first packet and a second packet,
selecting a first available radio channel suitable for incorporating said first packet in said first radio channel and a second available radio channel suitable for incorporating said second packet in said second radio channel,
incorporating said first packet in the first selected radio channel and incorporating said second packet in the second selected radio channel, and
transmitting said first selected radio channel with said first packet incorporated in the first selected radio channel and transmitting said second selected radio channel with said second packet incorporated in the second selected radio channel.

2. The method of claim 1, further comprising the steps of:
selecting a modulation scheme appropriate for the characteristics of a link budget of said radio transmission, and
transmitting said first selected radio channel with said first selected packet incorporated in the first selected radio channel, based on said selected modulation scheme.

3. A method according to claim 2, wherein for selecting a modulation scheme account is taken of a link budget of transmission.

4. A method according to claim 1, further comprising the step of multiplexing first and second packets into a multiplexed packet stream.

5. A method according to claim 4, further comprising a step of dividing the multiplexed packet stream according to a capacity and/or configuration of the first and second selected radio channels, into packets in order to form suitable radio frames to be transmitted through air over the first and second selected radio channels.

6. A method according to claim 1, wherein a further condition for selecting said first radio channel is that of having a size suitable for incorporating said first packet in said first radio channel.

7. A method according to claim 1, wherein packets formed from said line interface and packets formed from another line interface are merged together.

8. A method according to claim 1, wherein the channels are of different types.

9. A programmable device comprising a non-transitory computer-readable medium with a software program recorded thereon, the software program comprising instructions which, when executed on the device, cause the device to carry out the steps of claim 1.

10. A transmitter comprising a packet processor for transmitting or receiving a payload of a line interface, the packet processor comprising:
- a framer for dividing said payload into a plurality of data portions and for grouping said plurality of data portions so as to form first and second packets,
- a clock unit for providing a clock signal to said first and second packets, and
- a packet builder for adding a header to said first and second packets, said transmitter further comprising:
- a packet aggregator for multiplexing said first and second packets formed by said packet processor to form a multiplexed packet stream
- a packet allocator for allocating said first packet from said multiplexed packet stream to a first available radio channel having a suitable size for having said packet allocated, and for allocating said second packet from said multiplexed packet stream to a second available radio channel having a suitable size for having said second packet allocated, and
- a transmitter unit for radio transmitting said first available radio channel with said first packet allocated to said first radio channel and for radio transmitting said second available radio channel with said second packet allocated to said second radio channel.

11. A transmitter according to claim 10, further comprising means for selecting a modulation scheme appropriate for characteristics of a link budget of said radio transmission and means for transmitting said first available radio channel with said first packet allocated in said first available radio channel, based on said selected modulation scheme.

12. A transmitter according to claim 10, wherein said packet allocator is adapted for dividing the multiplexed packet stream according to a capacity and/or configuration of the first and second selected radio channels, into packets in order to form suitable radio frames to be transmitted through air over the first and second available channels.

13. A receiver for receiving radio transmission of a payload, said receiver comprising:
- a packet processor for receiving a first packet from a first radio channel and a second packet from a second radio channel, said first and second packets each including data portions of a specific payload, the packet processor being configured for:
  - breaking the first packet into a plurality of first data portions and for breaking the second packet into a plurality of second data portions, and
  - grouping together identified first data portions and identified second data portions while reconstructing said specific payload.

14. A receiver according to claim 13, adapted for receiving a radio channel containing at least a packet comprising payload information, and transmitting said payload information to a line interface.

15. A transceiver comprising a transmitter for radio transmitting a payload of a line interface, and further comprising the receiver of claim 13, wherein said transmitter includes a packet processor for transmitting said payload, said packet processor comprising:
- a framer for dividing said payload into a plurality of data portions and for grouping said plurality of data portions so as to form first and second packets,
- a clock unit for providing a clock signal to said first and second packets, and
- a packet builder for adding a header to said first and second packets, said transmitter further comprising:
- a packet aggregator for multiplexing said first and second packets formed by said packet processor to form a multiplexed packet stream
- a packet allocator for allocating said first packet from said multiplexed packet stream to a first available radio channel having a suitable size for having said packet allocated, and for allocating said second packet from said multiplexed packet stream to a second available radio channel having a suitable size for having said second packet allocated, and
- a transmitter unit for radio transmitting said first available radio channel with said first packet allocated to said first radio channel and for radio transmitting said second available radio channel with said second packet allocated to said second radio channel.

* * * * *